United States Patent
Moriyasu

[19]

[11] Patent Number: 5,857,986
[45] Date of Patent: Jan. 12, 1999

[54] INTERACTIVE VIBRATOR FOR MULTIMEDIA

[76] Inventor: Hiro Moriyasu, 1314 SW. 57th Ave., Portland, Oreg. 97221

[21] Appl. No.: 653,336

[22] Filed: May 24, 1996

[51] Int. Cl.⁶ ..................................................... A61H 1/00
[52] U.S. Cl. .......................... 601/49; 601/57; 273/148 B
[58] Field of Search .................................. 601/46, 49, 56, 601/57, 59; 484/45, 46; 273/148 B

[56] References Cited

U.S. PATENT DOCUMENTS

| | | | |
|---|---|---|---|
| 2,694,394 | 11/1954 | Miller | 601/56 |
| 3,270,440 | 9/1966 | Radosevic, Jr. | 434/59 |
| 4,030,208 | 6/1977 | Carver | 434/46 |
| 4,175,552 | 11/1979 | Johnson | 601/46 |
| 4,924,216 | 5/1990 | Leung | 273/148 B X |
| 5,022,384 | 6/1991 | Freels et al. | 601/57 |
| 5,123,405 | 6/1992 | McShirley et al. | |
| 5,215,078 | 6/1993 | Fulop . | |
| 5,235,967 | 8/1993 | Arbisi et al. | |
| 5,247,925 | 9/1993 | Yamasaki et al. | |
| 5,265,590 | 11/1993 | Takagi . | |
| 5,277,174 | 1/1994 | Schmidhauser . | |
| 5,305,738 | 4/1994 | Shimizu | 601/56 X |
| 5,311,860 | 5/1994 | Doria | 601/103 |
| 5,356,369 | 10/1994 | Yamasaki et al. | 601/70 |
| 5,389,865 | 2/1995 | Jacobus et al. | |
| 5,437,608 | 8/1995 | Cutler | 601/49 |

*Primary Examiner*—William H. Grieb
*Attorney, Agent, or Firm*—Dellett and Walters

[57] ABSTRACT

An interactive vibrator system provides stimulus to a computer user in response to interaction between computer and user. A signal pick-off device (16) gathers signals present at the computer input/output port (11) and delivers such signals to signal processing device (14) which in turn drives vibrator (21) to provide soothing vibration to the user's body. An interactive vibrator in conjunction with a multimedia computer detects pulses or the like from joystick or other input devices. Corresponding driving of one or more vibrators in response to the detected input device X, Y, Z movement commands or in response to detected audio output from the computer produces tactile feedback to a user of a multimedia game or the like. The vibrations can thereby simulate "G" forces or the like. The joystick, steering wheel or other such input devices are also suitably provided with vibrators therein to generate tactile feedback in response to operation thereof or in response to the audio signals.

7 Claims, 13 Drawing Sheets

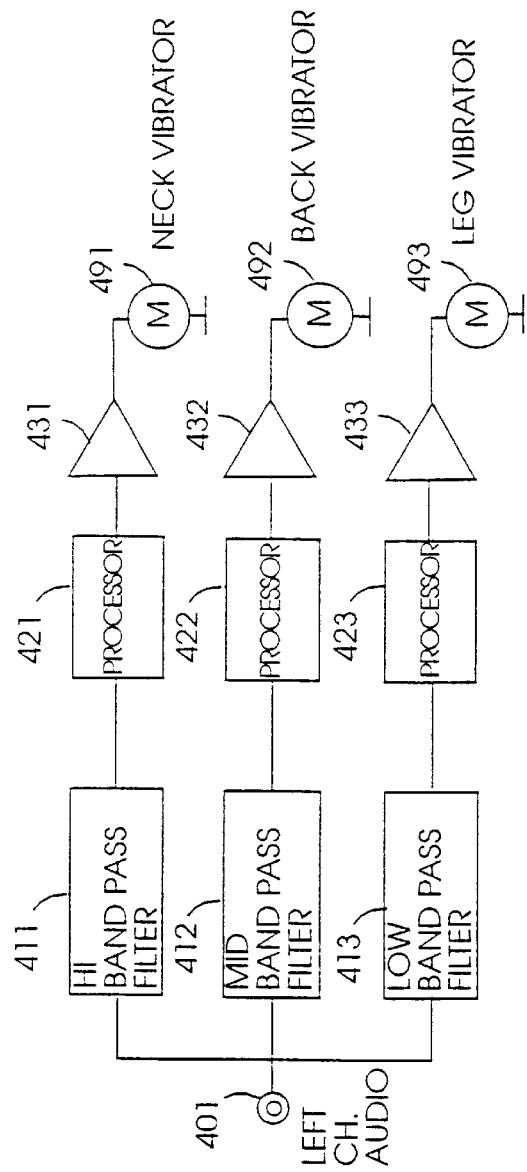
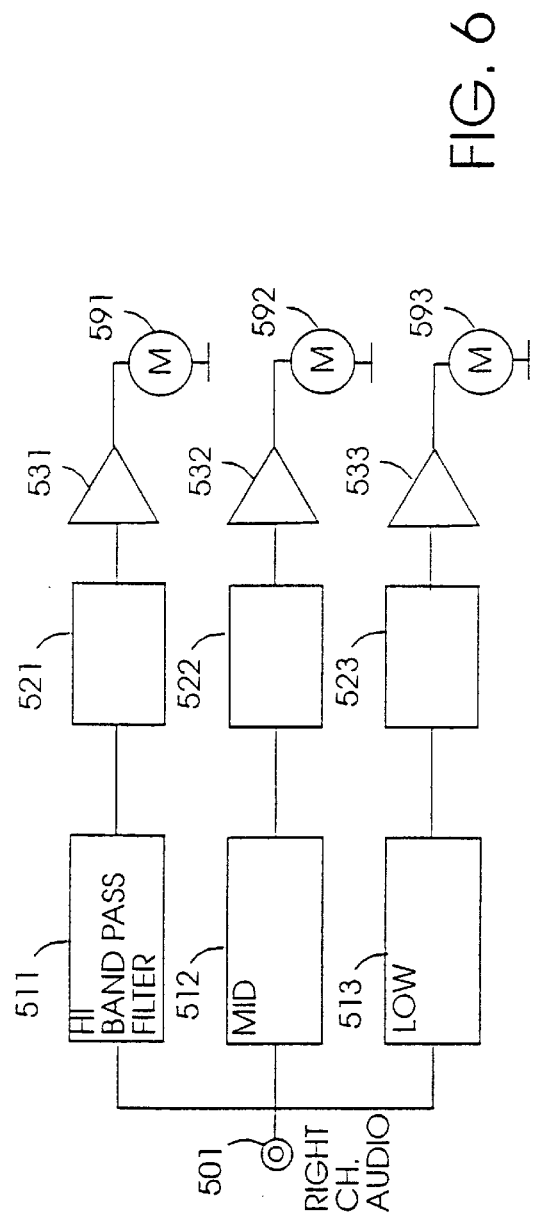
FIG. 6

INTERACTIVE VIBRATOR FOR MULTIMEDIA

This invention relates to personal vibrator systems and more specifically to a device to provide stimulus to computer users.

BACKGROUND OF THE INVENTION

The increasing use of personal computers at work and in the home has created a stressful environment for the user. Most available computer user input/output devices such as visual displays, hand-operated input devices, e.g. keyboard and mouse devices, and audio output devices interact with the upper part of the body, leaving the legs and feet inactive. This inactivity in the user's lower body can increase the stress to the computer user. A means to reduce stress and maintain alertness of computer users is desired. A desirable means would interact with the user; it would adapt its actions in response to the user's actions.

Numerous prior art personal vibrators are available, including vibrating chairs, foot massagers, and hand-held vibrating massagers. Conventional mechanical vibrators, having a steady motion pattern, are used to soothe but, do not provide a changing stimulus to the user to maintain alertness.

Other vibrators include pre-set vibrating patterns. Such fixed patterns are necessarily limited by the vibrator's controller and become monotonous over time.

A vibrator could be controlled by a programmable motor controller driven by a computer to provide interactive stimulus to the user. Such controllers, however, are expensive and require software specific to each type of computer with which they are used.

It can be seen that all prior art vibrators suffer from a number of disadvantages:

(a) They provide only constant or fixed patterns of vibration, thereby failing to maintain the user's mental alertness.

(b) They do not adapt to the user's actions to provide interactive stimulus.

(c) If one were to use a conventional controller with a vibrator to provide an interactive stimulus, software specific to the user's computer type would be required. As this software would need to be adapted to the specific processor, operating system, application software, and user interface equipment used, a great expense would be incurred in development and customer support.

The increase in multimedia computers has created sophistication in computer games, such as 3D space and adventure, flight simulation and driving simulators that offer fast acting graphics and sound effects.

The various input devices such as the mouse, joystick, steering wheel and pedals allow input to interact with software. Feedback to the user is mostly through graphics on screen and audio on the speakers. Although they offer virtual reality, they lack critical physical feedback.

The existing numerous personal vibrators, such as foot vibrators and vibrating chairs do not provide interactivity. Attempts to interface such vibrators to a computer's software and hardware requires modification to both the hardware and software. Therefore, the previous attempt limits the adaptability to the existing or yet unknown simulator and game software.

SUMMARY OF THE INVENTION

According to an embodiment of the invention, a vibrator for applying soothing and stimulating vibrations to a human body includes a vibrating device, a detector to detect electronic signals sent between a computer and an input/output device, and a circuit which drives the vibrating device in response to characteristics of said electronic signals. The vibrator is suitably positioned against a portion of the user's body, for example the feet or neck, and thereby provides soothing vibration action while the user is operating the computer.

Interactive vibrators according to an aspect of the present invention overcome the constraints of requiring specialized hardware and software to the computer system. This is done by the sensing signal created by users interactive moves at input devices such as a joystick, X and Y coordinate move, rate of move change, trigger buttons. The sensed signal is then processed to generate appropriate physical vibrating feedback to the user at various parts of the body. Physical vibrating motions may be a soothing or vigorous pulsating. The high G force may be caused by rapid acceleration and deceleration or quick turn right and left vehicle movement and actions. It can add pulsating patterns caused by firing of guns. By adding physical interactive feedback it allows environmentally realistic simulation to the user.

Accordingly, it is therefore an object of the invention to provide an improved personal vibrator with a non-constant and non-repeating action to soothe while maintaining the user's alertness.

It is another object of the invention to provide an improved vibrator which adapts to a computer user's actions to provide an interactive stimulus.

It is a further object of the invention to provide an improved vibrator with an interactive stimulus without requiring the use of software installed on the user's computer.

Another object of the invention is to provide an improved vibrator with an interactive stimulus which does not require equipment specialized to each type of computer.

It is yet another object of the invention to provide an improved vibrator with interactive stimulus which is easy for the user to connect to the user's computer.

It is an object of the invention to provide an improved vibrator which may be placed in one of several locations on the body.

It is yet a further object of the invention to provide an improved vibrator which has improved interactivity by varying strength and decay duration.

A further object of the invention is to provide realistic interactive vibrating feedback that represents two, three and more dimensional movements simulated by multimedia computers.

Another object of the invention is to provide physically realistic environment to multimedia computer system by adding multidimensional motion back to the user by controlling the user's chair.

Yet another object of the invention is to provide dynamic motion boosting signal that represents acceleration or deceleration caused by rapid driving or high "G" flight maneuvering of computer games.

A further object of the invention is to provide methods of detecting signal that represent the user's X, Y, Z, and rotate movement at input device such as a joystick at the input port of computer and to generate physical movement back to the user.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

BRIEF DESCRIPTION OF THE DRAWINGS

FIG. 6 is a block diagram of a method of audio-signal separation and signal processing for multi-channel vibrator control;

DETAILED DESCRIPTION

Figure 1:
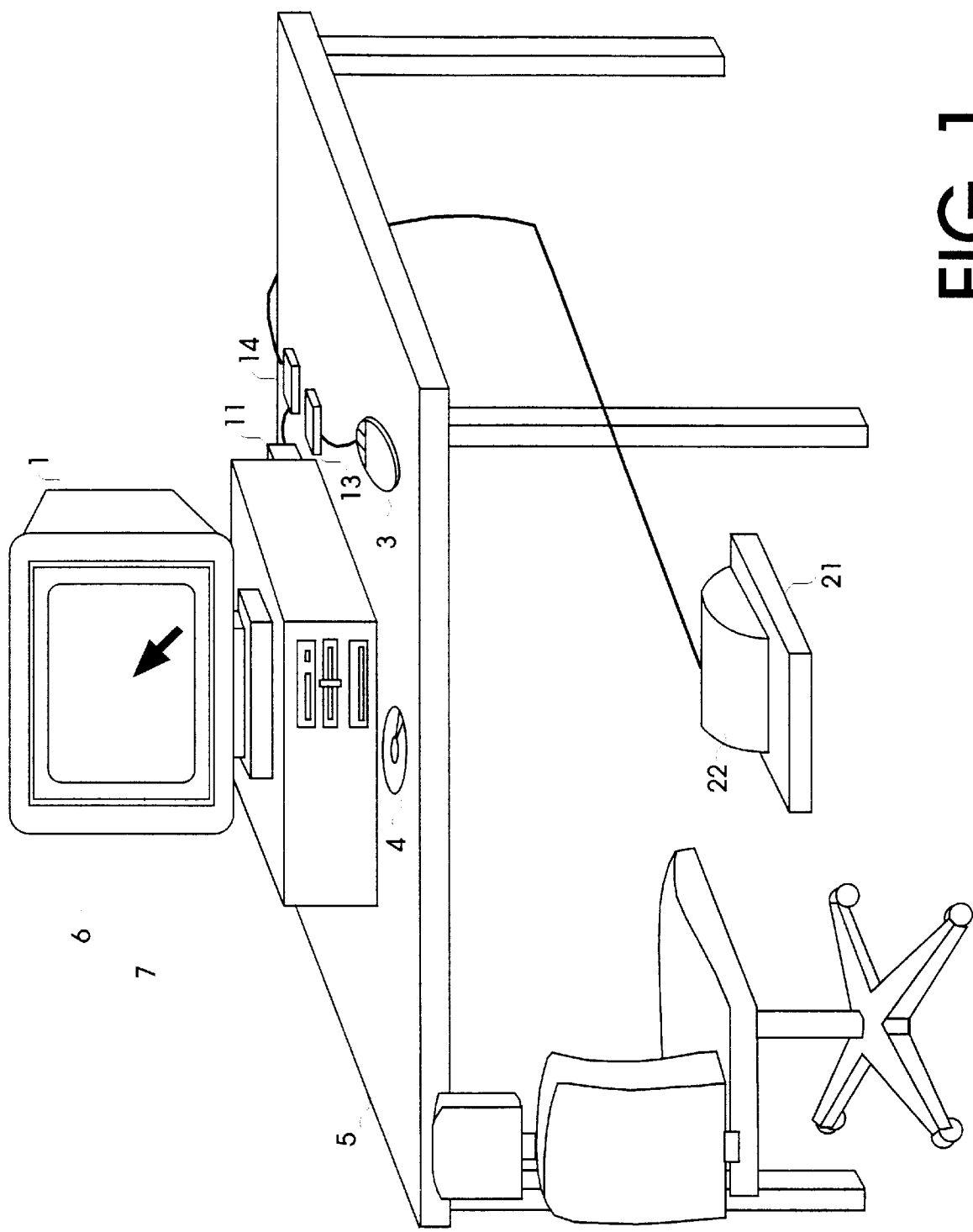
FIG. 1 is an environmental view of an interactive foot vibrator with pointing device input/output-signal detector.

Referring to FIG. 1, an environmental view of an interactive foot vibrator system of the present invention with pointing device input/output-signal detector, in the typical computer environment (shown on table 5 for clarity) a pointing device 3 is interfaced to a computer 1 and is used to control a pointer 7 on a computer display 6. The computer's interaction with the user is defined by the particular program, represented by disk 4, which is in use. In the preferred embodiment of the interactive vibrator system, a signal processing device 14 is electrically connected between a connector 13 of pointing device 3 and a computer input/output (I/O) port 11. The output of signal processing device 14 is electrically connected to a vibrating device 22, suitably contained within a footrest 21.

Still referring to FIG. 1, as the user moves pointing device 3 or pushes pointing device buttons (not shown) to operate the computer system, pointing device 3 sends signals to computer 1. Signal processing device 14 of the interactive vibrator system senses these signals and generates a driving signal for vibrating device 22. The drive signal and the resulting vibration have variable amplitude and duration depending on the nature of the user's actions. The vibration the user receives is therefore dependent on the user's actions, providing interactive feedback to the user. The interactive vibrations serve to soothe while maintaining the user's alertness.

Figure 2:
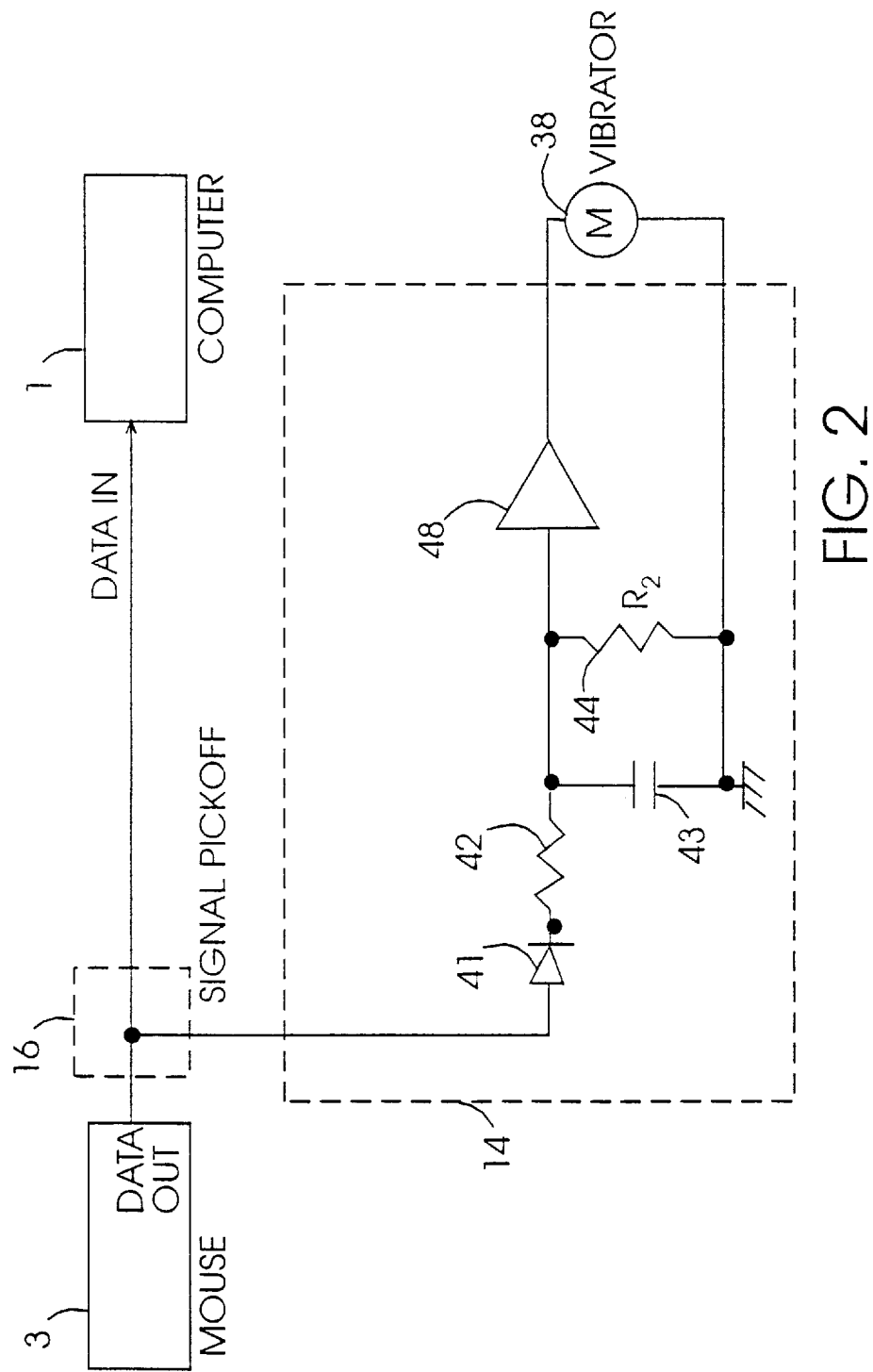
FIG. 2 is a simplified diagram of a circuit to detect and process a computer input/output signal.

Referring now to FIG. 2, a simplified schematic of a circuit to detect and process a computer input/output signal, the interactive vibrator system is attached to computer 1 through signal pick-off 16. Data transmitted from a computer I/O device such as pointing device 3 is picked-off by signal pick-off 16 and passed to signal processing device 14. Inside signal processing device 14, the signal is detected by a detector diode 41 and the data pulse is passed through an input resistor 42 and stored in a peak detecting capacitor 43. The stored signal drives an amplifier 48 to activate a vibrator 38.

Peak detecting capacitor 43 is discharged by a discharge resistor 44. Since the decay time is controlled by the RC time constant of peak detecting capacitor 43 and discharge resistor 44, mouse motion can be detected and prolonged vibrating motion can be controlled.

In operation, signal processing device 14 serves to capture charge from the (high frequency) data signals sent by pointing device 3 and filter them to drive the vibrator 38 with a smoothed (lower frequency) signal.

Figure 3:
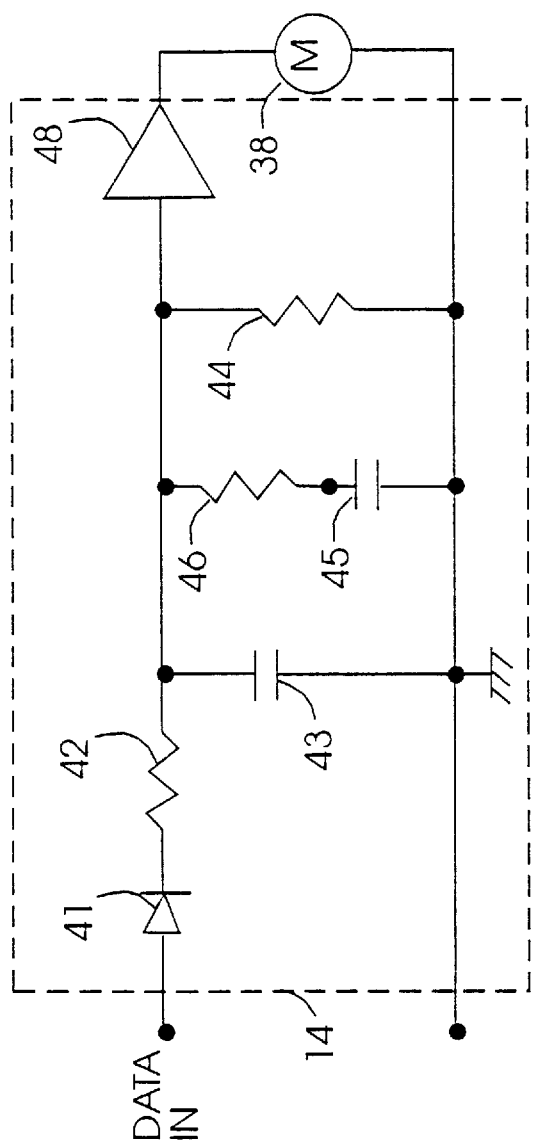
FIG. 3 is a diagram of a simplified circuit according to the invention for a dual mode of motor control.

FIG. 3 illustrates an embodiment of signal processing device 14 having dual modes of signal processing obtained by combining the peak detector of FIG. 2 with an integrator which prolongs vibrator motion and slowly decreases the motion to provide soothing action. The peak detector, consisting of detector diode 41, input resistor 42, and peak detecting capacitor 43, quickly responds to data pulses providing strong input signals to amplifier 48 and, hence, provides full peak power to vibrator 38. The integrator, comprising an integrating resistor 46 and an integrating capacitor 45, integrates charges from a number of data pulses, slowly charging integrating capacitor 45 to drive amplifier 48. In the absence of data pulses, integrating capacitor 45 discharges through integrating resistor 46 and discharge resistor 44.

The integrator charging time constant is approximated by:

(input resistor 42+integrating resistor 46)* integrating capacitor 45, where integrating capacitor 45 has capacitance typically ten or more times greater than peak detecting capacitor 43. The integrator decay time constant is approximated by:

(integrating resistor 46+discharge resistor 44)* integrating capacitor 45, where discharge resistor 44 has much greater resistance than integrating resistor 46.

The short time constant of the peak detector gives instant reaction after a mouse click or short mouse movement, while the longer time constant of the integrator detects frequent mouse use and gives prolonged vibrator action. The integrator retains its charge for a few seconds or tens of seconds after the data signal ends. As the integrator decays, the motor gradually slows down, thus providing soothing motion.

By combination of 3 modes, short burst instant response, motion retention period, and gradual decay, the vibrator unit interacts with the user each time the pointing device is activated and the vibrator responds in different modes depending on how the user interacts with the computer.

FIG. 3 illustrates an example of signal detecting and processing of a series of data pulses into short, high energy vibration motion and decaying vibration motion to provide soothing massage. It will be apparent to those skilled in the art that this principle can be implemented in a number of ways to achieve signal detection and processing by using digital logic gates, latches, state machines or microcontrollers to create various vibrating strengths, time durations and to control more than one set of vibrators.

Figure 4:
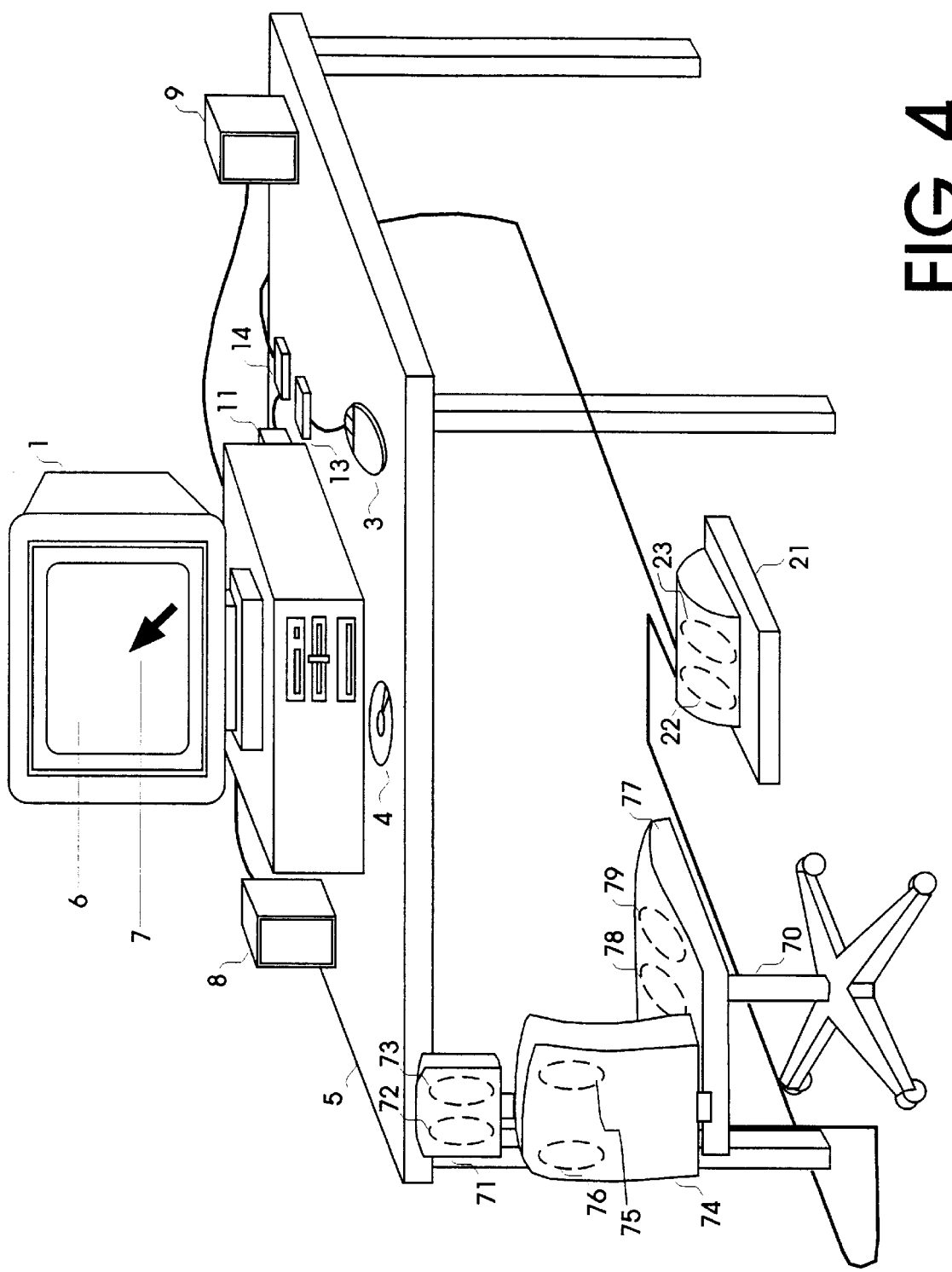
FIG. 4 an environmental view of a multiple-channel foot and body vibrator which detects signals at multiple computer input/output ports.

A multi-channel interactive vibrator system integrated with a multimedia computing system is illustrated in FIG. 4. First, describing the vibrator portion of this embodiment, multiple independent vibrating devices are placed in the user's footrest 21 and chair 70. These may include, but are not limited to, left and right foot vibrating devices 22 and 23, left and right headrest vibrating devices 72 and 73 located in headrest 71, left and right backrest vibrating devices 76 and 75 located in backrest 74, and left and right seat vibrating devices 78 and 79 located in seat cushion 77. Note that the vibrating devices may be placed internal or external to the user's footrest and chair.

Referring still to FIG. 4, the multi-channel interactive vibrator system may be connected to one or more computer I/O ports 11 including, but not limited to, I/O ports for pointing device 3, speakers 8 and 9, a keyboard (not shown), and a joystick (not shown). The vibrator system may also be connected to a general purpose I/O port, such as serial or parallel.

Each channel of the multi-channel interactive vibrator system of FIG. 4 operates in corresponding fashion to the interactive vibrator system of FIG. 1. The various vibrating devices are each driven independently by signal processing device 14 which receives inputs from one or more computer I/O ports to enable the vibrator system to respond to multiple I/O signals. The user accordingly receives soothing vibrations to several parts of the body, each dependent upon the user's actions, enhancing the interactive feedback.

Figure 5:
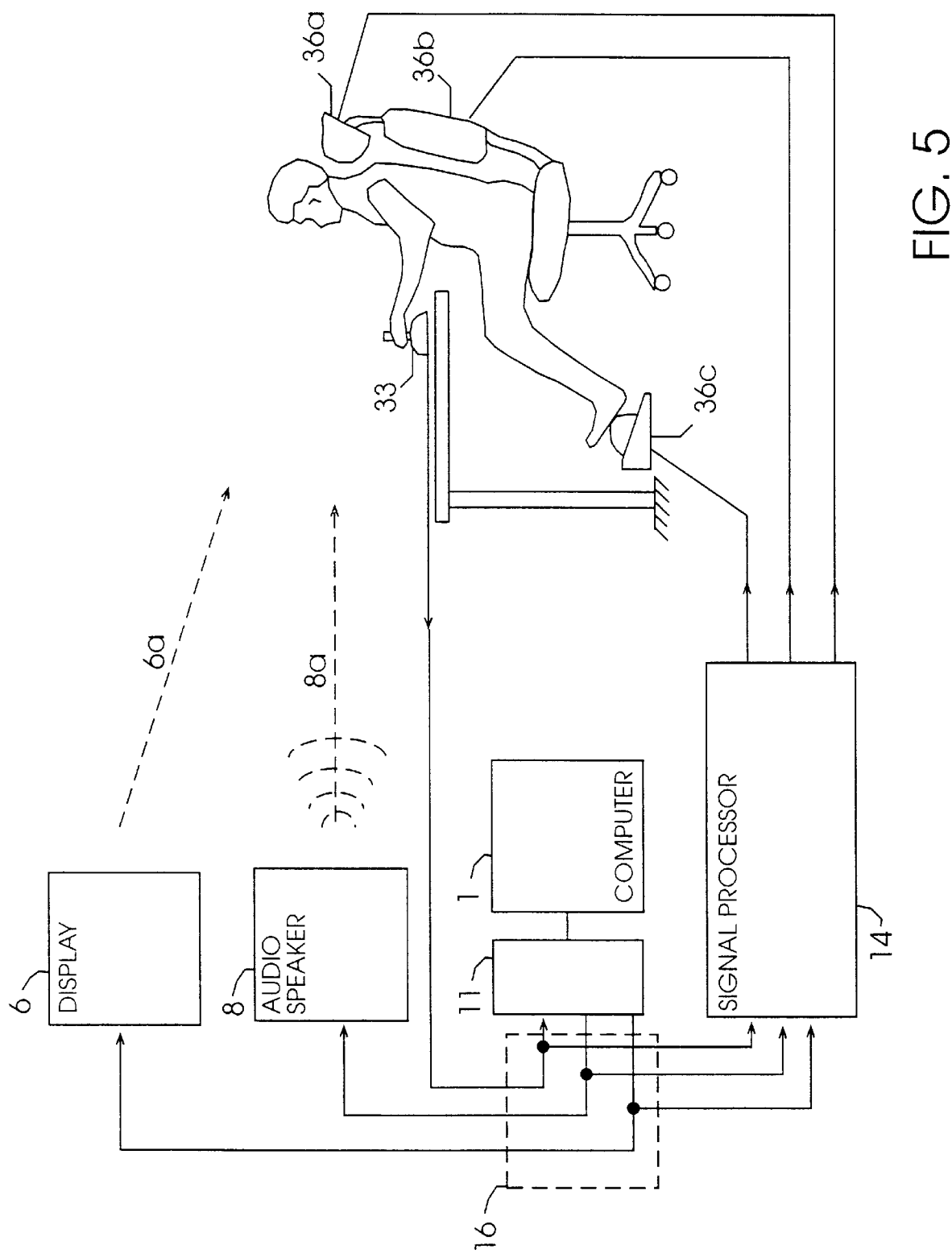
FIG. 5 is a block diagram of a multiple-channel foot and body vibrator according to the invention.

FIG. 5 illustrates the multiple-channel interactive vibrator system in block diagram form. As shown previously in FIGS. 1 and 2, signal pick-off device 16 gathers signals present at computer I/O port 11 and delivers such signals to signal processing device 14 which in turn drives headrest, back, and foot vibrators 36a, 36b, and 36c.

In operation, the user interacts with computer 1 by sending messages with pointing device 33. The computer responds to the user's inputs by displaying information on display 6 and driving speaker 8. The user sees the displayed information, represented by 6a, and hears the sounds, represented by 8a. The interactive vibrator system of the present invention, detects communications from the user to computer 1 and from computer 1 to the user and responds by providing soothing vibration to various parts of the user's body. The locations, strengths, and durations of the vibrations depend upon the characteristics of the detected communications. In this manner the vibrator system participates in the interaction between the computer and the user, enhancing the soothing effect.

FIG. 6 is a block diagram of an audio-signal separation and processing method to control multiple vibrators in the multi-channel interactive vibrator system. The audio signal from the computer left audio channel is applied to an input 401 and signal is passed through high, mid range, and low bandpass filters 411, 412, and 413 which perform bandpass separation to treble, mid range and bass. The separated signals are passed through signal processors 421, 422, and 423 and drivers 431, 432, and 433 to control neck, back, and leg vibrators 491, 492, and 493 which may also be placed strategically in other areas of the vibrating chair and foot rest. Signal processors 421, 422, and 423 generate differing amplitude and duration driving signals to provide varying vibration feedback to the user.

The audio signal from the computer right audio channel is similarly processed through a circuit with corresponding function as shown in the bottom half of FIG. 6, wherein right channel audio is applied to an input 501 and signal is passed through high, mid range, and low bandpass filters 511, 512, and 513 which perform bandpass separation to treble, mid range and bass. The separated signals are passed through signal processors 521, 522, and 523 and drivers 531, 532, and 533 to control neck, back, and leg vibrators 591, 592, and 593.

Figure 7:
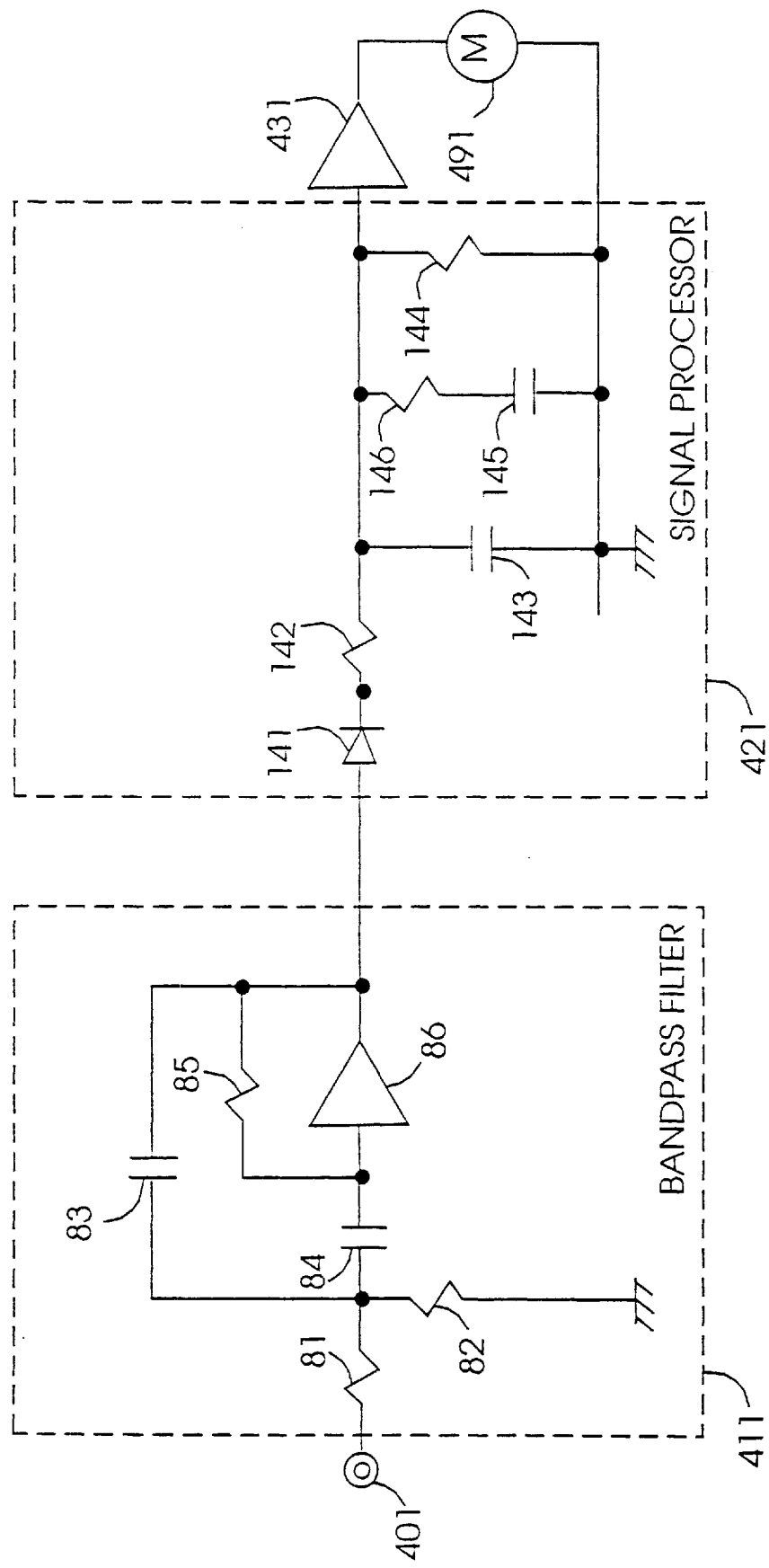
FIG. 7 is a diagram of a simplified circuit to separate and process an audio signal for multi-channel vibrator control.

Referring to FIG. 7, which illustrates, in simplified schematic form, an example of a circuit to provide audio band frequency separation and processing, a signal applied to audio input 401 is supplied through bandpass filter 411, comprising resistors 81, 82, and 85, capacitors 83 and 84 and amplifier 86. Those skilled in the art of electronics will recognize this as a conventional bandpass filter with center frequency controlled by specific selection of resistor and capacitor values.

FIG. 7 also illustrates audio channel signal detection and processing to activate vibrator devices. The signal detected at the multimedia computer I/O channel or, as shown, at audio channel 401, consists of sound signal with various peak voltage and frequencies. The signals are filtered then captured by a signal processor 421, comprising a detector 141, a peak detector resistor 142, and a peak detector capacitor 143, an integrator resistor 146, an integrator capacitor 145, and a duration control resistor 144. Signal processor 421 detects the audio signal peak envelope and creates variable signal amplitude and duration to drive vibrator 491 through driver amplifier 431.

While the embodiment of FIG. 7 is illustrated with analog components, persons skilled in the electronics field may appreciate that this type of function may be implemented by other devices, such as switched capacitor filter or Digital Signal Processor (DSP), to achieve channel separation, signal amplitude, and duration to control the motion of various vibrators within the spirit of the present invention.

Figure 8:
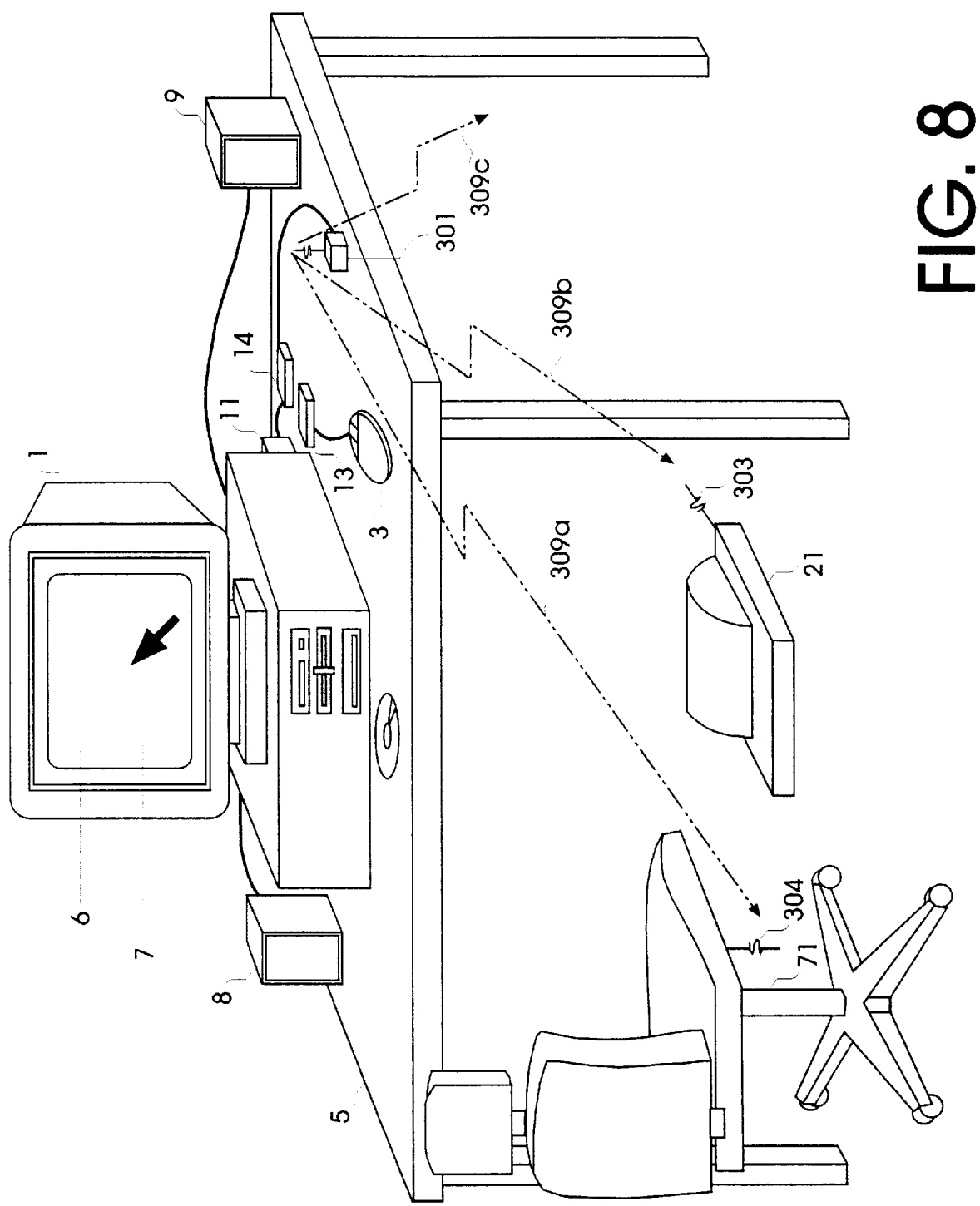
FIG. 8 is an environmental view illustrating an interactive foot and body vibrator activated by computer input/output through an electromagnetic transmitter/receiver pair.

FIG. 8 illustrates remote operation of the vibrators via wire-less transmission. In this embodiment of the multi-channel interactive vibrator system, the connections between signal processing device 14 and the vibrators are via radio-frequency signals represented by 309a, 309b, and 309c from a transmitter 301 to receivers 303 and 304. Signal processing device 14 and transmitter 301 may be physically separate or integrated.

In operation, the remote coupling shown in FIG. 8 allows the user to work unencumbered by wires between various parts of the vibrator system. While the illustration shows a radio-frequency link, those skilled in the art can see, however, that other means of remote coupling such as ultrasonic or infra-red transmitter/receiver can be utilized.

Figure 9:
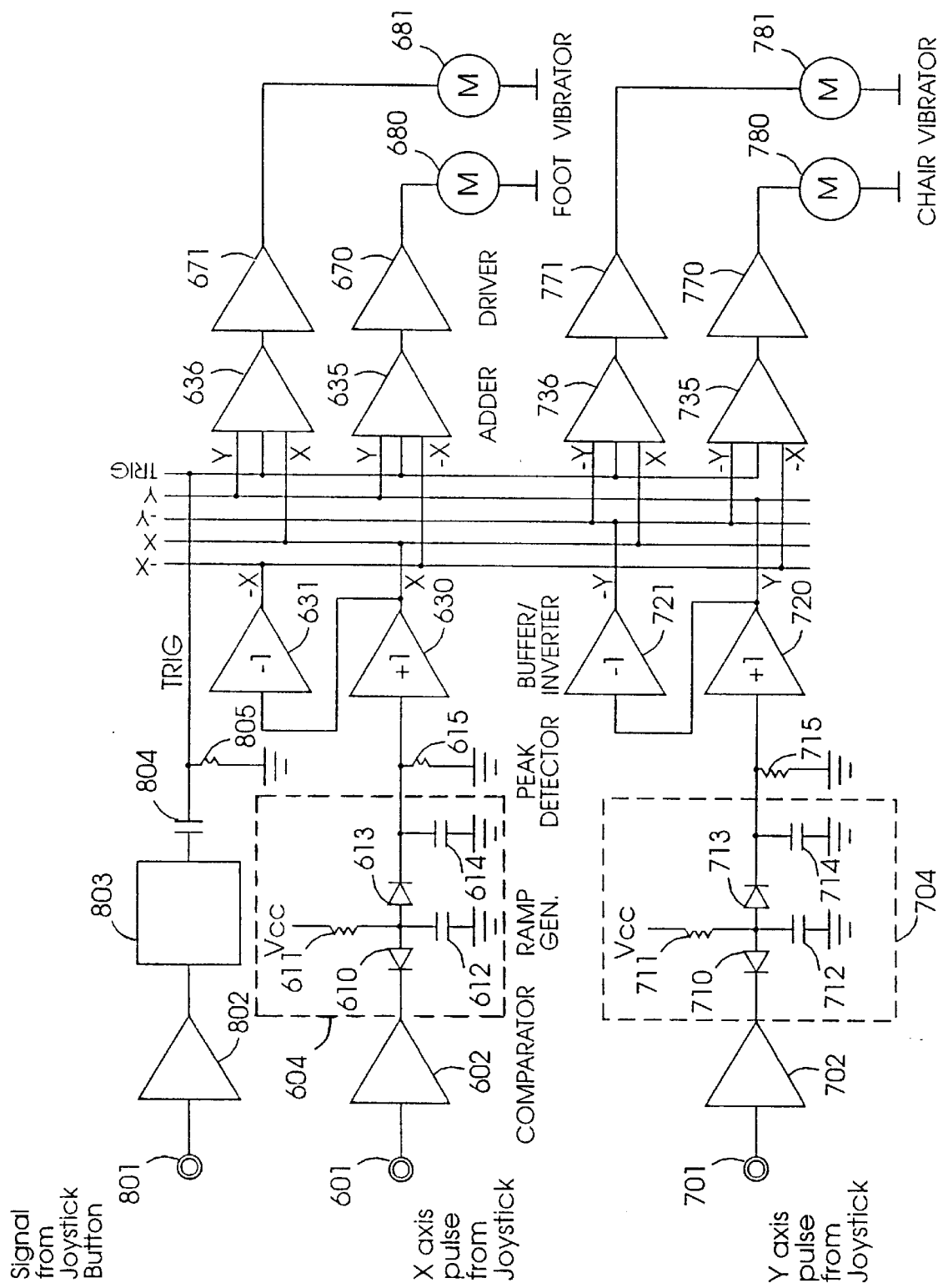
FIG. 9 is a simplified circuit diagram of a multichannel vibrator controller that detects X and Y joystick movement, and joystick button movement.

FIG. 9 schematically illustrates the operation of multidimensional vibrator that interacts movement of computer input devices such as a joystick and buttons of a joystick. Flight simulator, driving simulator and 3-D adventure type software use two dimensional or three dimensional inputs devices such as joysticks. The software reacts to the movement input devices and provides graphical and audio interactive feedback to the user. However, the current art lacks physical feedback to add realism to the simulated environment.

The basic objective of the circuit is to create physical X and Y vibrating sensations to the user. Game input devices such as a joystick contain X and Y potentiometers to sense X and Y axial movement of the joystick. Typically 100 kilohms potentiometers are used and when the sticks are moved the resistance value changes 0 to 100K ohms.

These potentiometers control the monostable vibrator within the computer I/O card, where the potentiometer is a variable resistance of an R-C charging time constant. A monostable vibrator responds to varying resistor caused by the movement of the joystick and outputs typically 1.12 us wide pulses when the potentiometer value is 0 ohms and 1.2 ms when the value of resistance is the maximum of 100K ohms. Since potentiometers are connected to the charging capacitor of monostable oscillators, detecting signal pulsewidth at one node of the potentiometer allows decoding of X and Y movement of the input devices.

Now, referring back to FIG. 9, the signal processing of X and Y pulses, and how X and Y signals are combined to produce X and Y vector vibrating motions will be described in greater detail. An X axis pulse from the joystick is applied to the X input, 601. This signal amplitude is typically 0 volts to 3.5 volts during the computer's monostable high state. The input comparator 602 compares an incoming signal with a reference bias (not shown). When the X-pulse rises above reference voltage, the comparator 602 will generate an output high and output low when the X-input pulse resets to below reference voltage. The output of comparator will be processed through X pulse to voltage convertor 604. The output of comparator 602 actuates the ramp generator consisting of a clamp diode 610, charging resistor 611 and ramp capacitor 612. In absence of an X-pulse the comparator 602 is at low, thus charging current from the charging resistor 611 is pulled down low thus ramp capacitor 612 is discharged to low. When an X-pulse arrives and the comparator, 602 output goes high, it disconnects clamping diode, 610 and allows the charging resistor to charge the ramp capacitor to create an increasing voltage at the ramp capacitor. The voltage increases upward during the input X-pulse high period.

The peak voltage at ramp capacitor 612 is transferred to a peak detector consisting of a peak detector diode 613, a peak voltage holding capacitor 614 and a discharge resistor 615. The peak holding capacitor 614 holds the peak voltage even though the ramp capacitor 612 is discharged to low when the input signal goes to low state. The discharge time constant of peak detector is determined by the capacitor 614 and resistor 615. The discharge time constant is set to approximately 4 times the repetitive rate of incoming signal.

The peak voltage representing pulse-width of X that represents the X axis movement is buffered by the amplifier 630. The inverter amplifier 631 produces negative X (−X) signal. Likewise, the Y axis pulse from the joystick at Y input 701 is processed in a corresponding manner as the X pulse-signal through Y pulse-width to voltage converter 704. The Y comparator 702 creates gating pulse to the ramp generator consisting of clamp diode 710, charge resistor 711 and ramp capacitor 712. The peak detector consisting of diode 713, capacitor 714 and resistor 715 generates an analog voltage proportional to Y pulse-width that represents Y axis movement and results in Y signal at the output of the buffer amplifier 720 and the inverted negative Y (−Y) signal at the output of the inverter amplifier 721. Having X, −X, Y and −Y signals that represent the physical movement of the joystick or X and Y positioning device, the X and Y signals will be further combined to activate the vibrators.

Although for this illustration the ramp generator is illustrated by diodes, a resistor and a capacitor, other various integrator circuits may be used. Likewise, the diode and capacitor peak detector may be replaced by a track and hold circuit to achieve the same function. It is well understood among those skilled in the art, that analog pulse-width to voltage conversion, as illustrated, may be achieved by digital technique. This is done by counting clock pulses which are gated by incoming X and Y pulses. The counted value is then converted to analog voltage by an A to D converter.

To create the physical vibrating environment, two vibrators are placed in the foot unit, for the left foot vibrator 680 and the right foot vibrator 681. Also there are two vibrators placed in the back of the chair, left back vibrator 780 and right back vibrator 781.

The right foot vibrator 681 is driven by the combined X and Y signal vector. The mathematically added signal of X and Y signal is applied to the output driver 671 to activate the right foot vibrator. The right foot vibrator responds with various strengths based on the joystick movement. For illustration purposes, assume X value at the output of amplifier 630 will produce voltage between 0 volts and 1.0 volts. For example, output voltage is zero volts if the joystick is moved all the way left, 0.5 volts at the center position and 1.0 volts when the joystick at full right position. Likewise, assume Y amplifier 720 produces 0 to 1.0 volt signal. When the joystick is at the center position X and Y values are at 0.5 volts each. The summation of the two signals X and Y at center position will yield 1.0 volts at the output of the summing amplifier 636. Movement of the joystick from the center position right or forward produces higher voltage. For example, forward movement produces 1.5 volts and right movement produces 1.5 volts. If the joystick is moved fully to the right and fully forward simultaneously, the summed X and Y signal at the output of the summing amplifier results in 2 volts. Thus the maximum vibration of two units is applied to the right foot vibrator. Four analog adders, 636, 635, 736 and 735 perform summation and subtraction of X and Y signal to produce the four quadrant signals. The four quadrant signals produce varying strengths of vibration in accordance with X and Y movement of the joystick. If the joystick is pushed forward the two front foot vibrators 680 and 681 increase in strength and the back vibrators decrease. If the joystick is pulled backward the back vibrators 780 and 781 increase in strength and the front foot vibrators decrease.

Likewise, if the joystick is moved to the right, both the right foot vibrator and the right back vibrators respond more strongly. At the same time this reduces the drive to the left side of both the foot and back vibrators. This X-Y related varying vibration will create a more realistic physical environment of flying or driving.

The joystick buttons are used to shoot weapons in some games or simulators. To create the jolting vibration from firing of weapons using the trigger button the signal is processed as follows. The signal from the joystick button is applied to the input 801. Typically the button produces a high to low signal at the input 801. This signal is buffered through buffer 802 and is applied to the pulse sequence generator 803. The sequence generator contains pulse sequences of one shot, short burst of pulses to create a jolting vibration caused by firing of weapons as is the case in some games or simulator using trigger buttons. These pulses from the pulse sequence generator are passed through the AC pulse coupler (or differentiator) to create the addition or subtraction signal to the adders 635, 636, 735 and 736. The AC coupling or differentiating action by 804 and 895 will create both positive spike and negative spike for each pulse cycle. This positive and negative pulse spike added to the adders 635, 636, 735, 736 will ensure output at the adder independent of signal level of adder.

Figure 10:
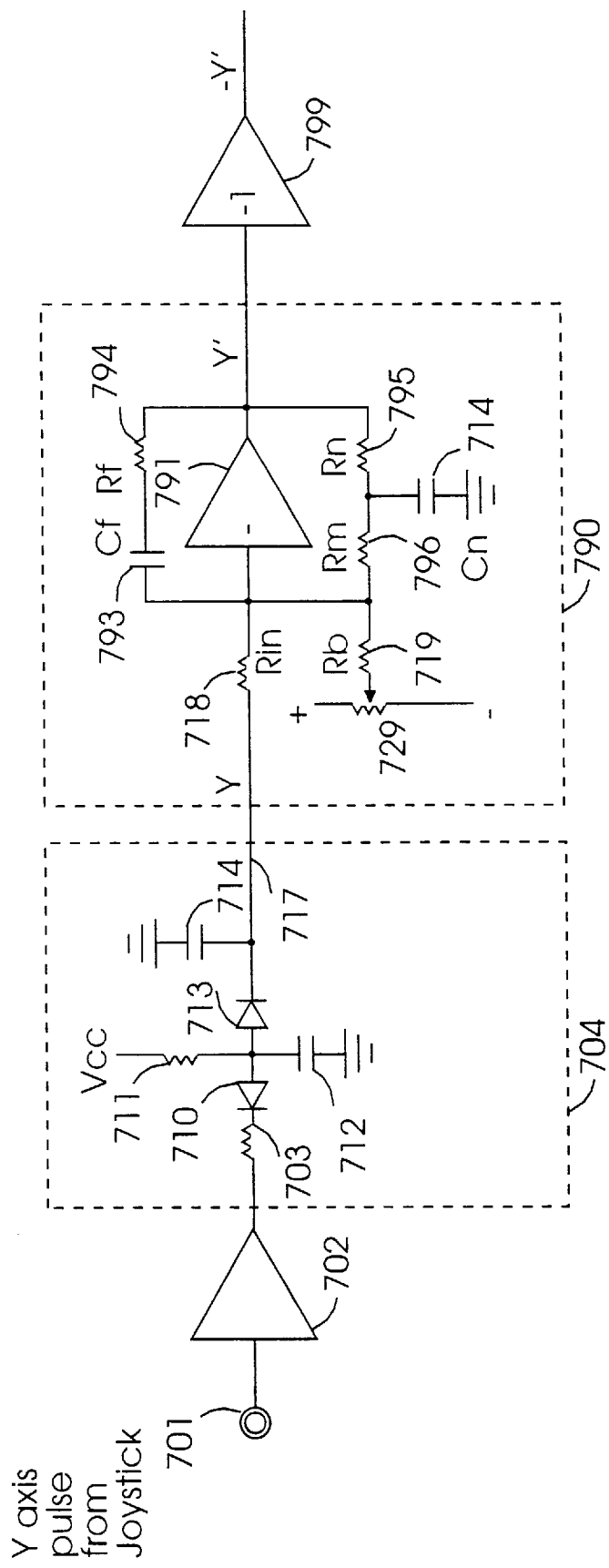
FIG. 10 is a schematic diagram illustrating the dynamic motion booster circuit.

FIG. 10 illustrates schematically the analog signal processing circuit to the dynamic signal booster based on the rate of the joystick movement change. The dynamic booster signal 790 is shown in dotted line block. The Y axis pulse signal from the joystick is applied to the input 701 and comparator 702 and is passed through the pulse-width to voltage converter 704 that consists of components 703, 710, 711, 712, 713 and 714, to create Y signal at 717. The dynamic signal booster 790 that is contained in the dotted block will be explained next. The Y signal at 717 is applied to the rate of change operational amplifier 791. The dynamic gain of the amplifier 791 is controlled by the ratio of the feedback resistor Rf 794 and the input resistor Rin 718. If Y signal changes rapidly, the voltage Y at the input 717 is boosted by the gain factor of the Rf/Rin. If this gain is 4 then rapid change in Y signal is enhanced 4 times. The feedback resister 794 is AC coupled by feedback capacitor 973. The DC gain of the boosted amplifier is ratio of DC feedback (Rn 795+Rm 796) divided by input resistor Rin 718. The DC gain is selected to be less than unity (0.3 to 0.5). Therefore, the boosted AC gain of 4 times will decay to less than unity with a time constant of (Rn//Rm)* Cn. Since this circuit contains two feedback loops with different characteristics, the response of the dynamic signal booster 790 will have second order response. This overshoot and slight ringing response will simulate mechanical response. This dynamic motion booster simulates "G" forces experienced when vehicle motion is suddenly changed in Y direction (or X direction not illustrated).

If the joystick is rapidly moved and then held in a stationary position at any given place, the signal is boosted and then decays with a slow time constant of the DC feedback loop. This negative decay (null) time constant (Rn//Rm)*Cn is typically set to 0.5 to 5 seconds range. The null voltage is determined by the steady state voltage of input Y and null balance voltage set by potentiometer 729. The DC gain or static Y position gain of this dynamic booster is set by the DC feedback resistor ratio of (Rn+Rm)/Rin. The static vibration level is set by the potentiometer 729.

DC null feedback consisting of Rn, Rm and Cn with a slow feedback also acts as an automatic balance for the joystick center position.

This dynamic signal booster can be incorporated in the multichannel vibrator system shown in the previously illustrated FIG. 9. The dynamic signal booster will replace conventional unity gain amplifier 630 and 720 to achieve both X and Y dynamic motion boost.

Figure 11:
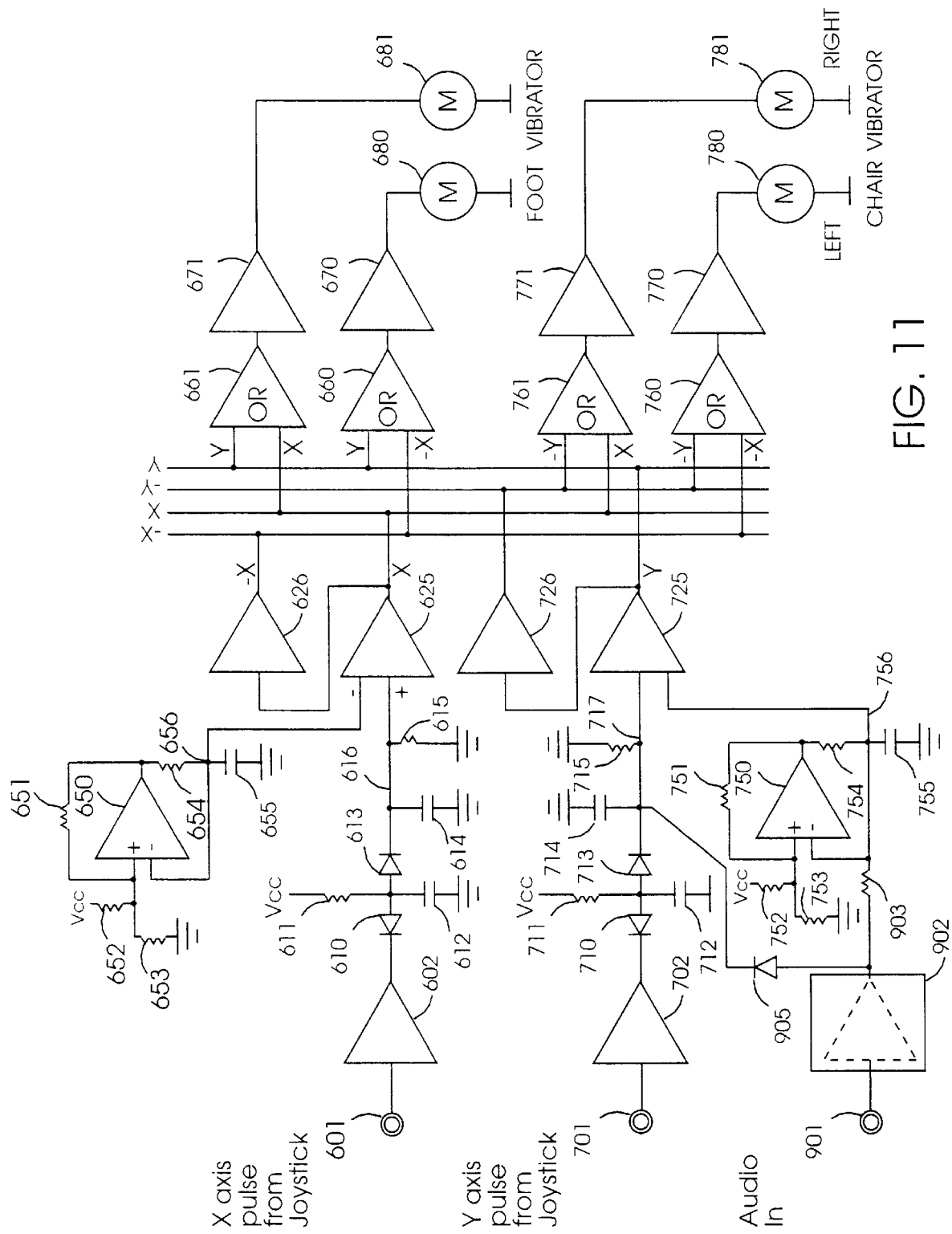
FIG. 11 is a simplified circuit diagram of a multichannel vibrator controller that responds to X and Y movement of a joystick and an audio signal.

FIG. 11 illustrates schematically another embodiment of the multidimensional vibrator system according to present invention. The vibrator interacts with the movement of input devices such as a joystick. The principle operation of this embodiment corresponds to the system described in the FIG. 9. FIG. 11 illustrates the signal processing and output drive may be accomplished by digital control means such as duty cycle modulation. X and Y axis pulses from the joystick are applied to the input terminals 601 and 701. The audio channel signal is applied to the input 901. To illustrate the basic operation of the digitally controlled multidimensional vibrator, first follow an X axis pulse signal applied to the X input terminal 601. Varying the joystick movement to X direction (right) will result in a wider pulse at the input. The output pulse is converted to voltage by pulse-width to voltage converter, consisting of components 610, 611, 612, 613, 614 and 615. The X signal goes to comparator 625 which compares it with the reference triangle signal generated by the oscillator 650. The free running triangle oscillator 650 consists of charging resistor 654 and charging capacitor 655, to provide negative feedback to the negative input of the amplifier. The comparator voltage feedback resistor network consists of resistors 651, 652 and 653. The free running oscillator operates as follows: Initially if output of the oscillating comparator 650 is low, the signal at the negative input side of the oscillator is also low voltage. The positive input side of the oscillator will be at positive level (approximately ⅓ Vcc). The voltage at the positive input of the oscillator is determined by the voltage divider action of resisters 651, 652 and 653. The positive bias by resistor 652 will set positive input to approximately ⅓ Vcc. Therefore, it will cause the output oscillator to switch to high. When the output voltage goes high it raises the input terminal voltage of the oscillator to a higher voltage (approximately ⅔ of Vcc) and holds the output high. This output high will cause charging resistor 654 to charge capacitor 655 upward. This voltage at the negative input comparator 650 is eventually charged above positive comparison voltage (⅔ Vcc) then the output is switched to low. The output low will cause charge resistor 654 to reverse the current to the capacitor 655 to discharge until the voltage reaches low comparison voltage of ⅓ Vcc. The charge and discharge action continues the free-running of oscillator 650. This repeated charge and discharge cycle generates a rectangular voltage at the capacitor and resistor node 655 and 654. The triangular signal 656 is now applied to the negative input of duty cycle comparator 625. If the X signal is more positive than the negative input X triangle voltage 616 the output of comparator 625 will go high. As the X signal increases, the duration of the X signal becomes larger, thus creating a higher duty cycle signal at the output of the comparator 625.

The duty cycle of the X signal is typically set to 20 to 80% range by proper selection of circuit parameters. Likewise, the Y signal is processed similarly as the X signal to create a Y output signal with duty cycle of 20 to 80%. This is achieved by Y comparator 702, pulse-width to voltage converter consisting of components 710, 711, 712, 713, 714 and 715, free-running triangle oscillator 750, consisting of components 751, 752, 753, 754, and 755 and duty cycle comparator 725.

The output pulses X, −X, Y and −Y from comparators 625, 626, 725 and 726 are added by the "OR" gates 661, 660, 760 and 761. The "OR" gates act as positive pulse adders and combine the X and Y pulse and increases in the duty cycle of output at the summing "OR" gates.

If X and Y pulses are asynchronous the output pulses are statistically added at the output of the "OR" gate. In this example, X and Y are modulated by two separate modulating free running oscillators 650 and 750. "OR" gating adds X and Y pulses; this increases the duty cycle of the output and also creates lower beat frequency. The resultant low beat frequency is determined by the delta frequency of X and Y pulse frequency. This resulted beat frequency can add additional low frequency beat to the vibrating motion that simulates low frequency rumbling vibration generated by a vehicle engine, for example.

The combined output of "OR" gate 661 through output driver 671 driving the right foot vibrator 681 results in an increase vibrator strength, as X and Y signals increase. The maximum strength to the right foot vibrator will be when the joystick movement is at full right and forward position. It will be reduced to a minimum when the joystick is pulled back and shifted to the left. Similarly to "OR" gate 661 then "OR" gates 660, 761 and 760 will combine, −X, Y, −Y. The signal to produce output pulses at the outputs of the "OR" gates produces, in effect, representation of X and Y vector joystick movement.

The configuration of foot vibrators left 680 and right 681 and chair vibrators left 780 and right 781, when driven by a composite X and Y vector signal, will create, as a result of the X and Y movement of the joystick, a physical vibrating environment simulating sensations experienced in flying or driving.

Still referring to FIG. 11, the modulating of the vibrators by audio signals will be explained. The audio signal from the audio channel coming from the computer is applied to the audio input terminal 901. This signal is passed through the audio processor 902. The audio signal processor, 902 may be a simple amplifier, bandpass amplifier (not shown) or a DSP based processor (not shown). The processed audio signal will modulate the amplitude of the vibration through amplitude detect diode 905 and phase modulate signal passed through resistor 903. The processed signal from the output of 902 is applied through detect diode 905 to the peak holding capacitor 714 of Y channel to modulate the amplitude of Y signal. The output from the audio processor is fed to the charging capacitor 755 through resistor 903 of free running oscillator 750 to produce an additional phase modulation signal at 751.

The vibrator driven with amplitude and phase modulated signal will interact with the flight or game software. Driving simulators, flight simulators and 3D adventure games typically produce background music. In some games an explosive audio sound occurs when a vehicle crashes or is hit by an unfriendly attacker. By sensing these audio signals and converting to appropriate vibration, the invention further enhance the physical experience. For example, using a background sound to modulate Y modulation frequency from the X modulation frequency will result in a slow beat frequency in a vibration to simulate a cruising motion.

On the other hand, if a high amplitude audio signal is detected, such a signal will be processed by signal processor 902 and generate a pulsating large amplitude signal that is fed through detector diode 905 to peak holding capacitor 714. Adding an over driven or pulsating signal to the peak detector will simulate an abnormally strong vibration when an unusual audio signal is detected. Physical feedback via a vibrating motion caused by an audio signal further creates realism.

Although the audio processor 902 is shown with an amplifier in the block, those skilled in the art can recognize and apply various signal processing techniques to create numerous vibration modulations. The audio signal processing may be accomplished by various well-known techniques such as bandpass, DSP processors or digital pulse circuits to produce the various amplitudes of varying and pulse sequences. Accordingly, such implementations of using various signal processing techniques to modulate vibrator aptitudes or time sequences are covered by the spirit of present invention. Furthermore, it is also possible to apply the process audio signal to any signal path to create vibrating modulation. Accordingly, it is understood that such variation is also covered by the spirit of the present invention.

Figure 12:
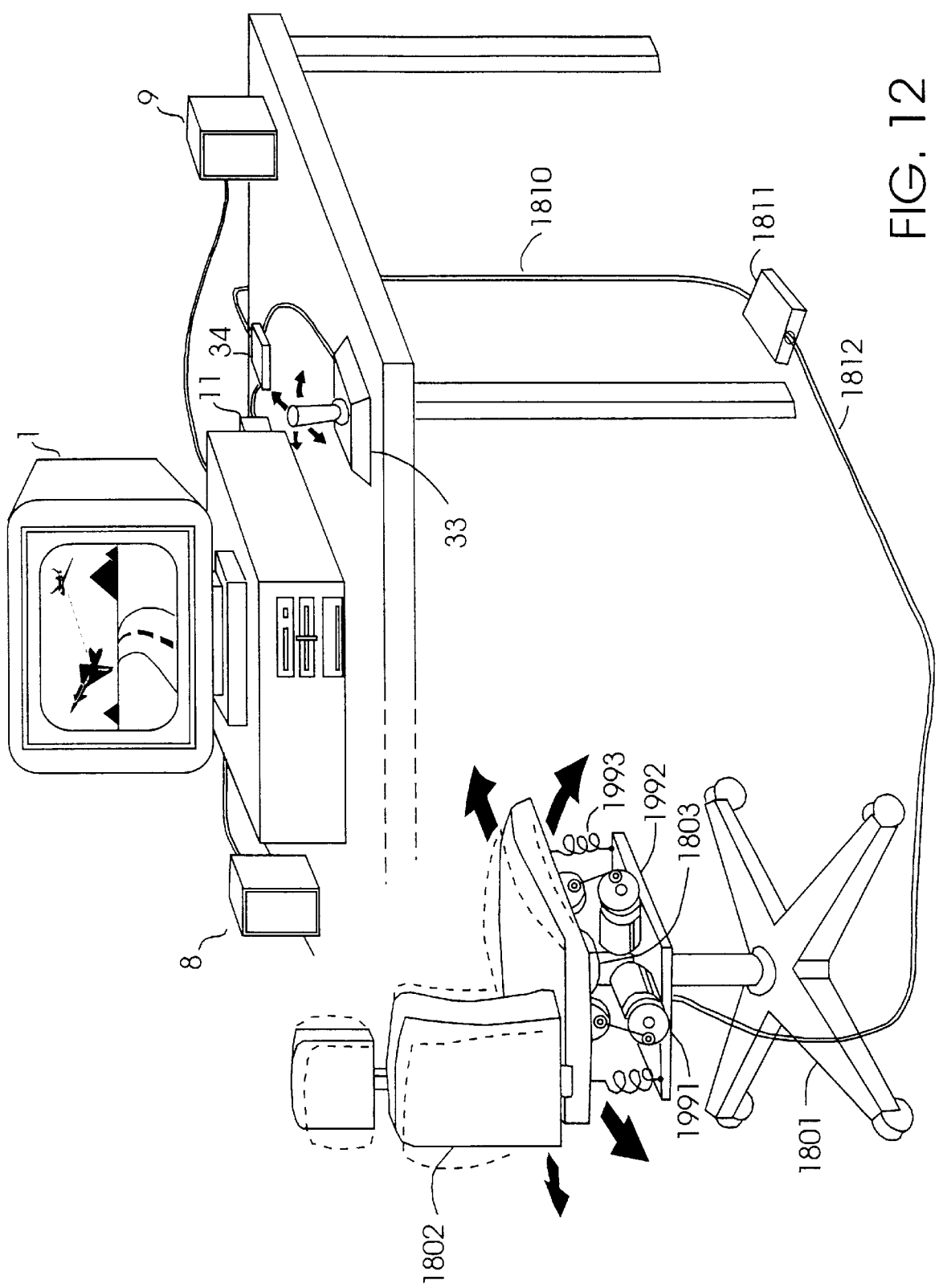
FIG. 12 illustrates a simplified environmental view of the interactive vibrating chair, that contains a tilting chair mechanism.

FIG. 12 illustrates a simplified environmental view of an interactive vibrating and motion chair that contains a tilting chair mechanism. In this embodiment of the invention, two geared motors are attached under the chair to respond to processed X and Y signals from the joystick. The chair will tilt forward or back and to the left or right according to the joystick X and Y vector movement.

Within the multimedia computer system (1, 11, 8, 9), joystick 33 signal is picked up by the detector unit 34. The signal is processed by X and Y signal processor 1811. The processed signal is connected by cable 1812 to the base of vibrating and tilting chair 1801. The chair base 1801 contains X and Y motion geared motors 1991 and 1992 to tilt the chair back and the seat 1802 either left or right. Geared motors may create X or Y axis motion by the well-known cam and rod drive or by linear screw-drive motors. The bottom of the chair rests on the pivot 1803 that is placed directly therebelow. The chair bottom may be stabilized by additional springs 1993.

Functional characteristics of X and Y motion processors are basically equivalent to the X and Y joystick signal processors shown in the FIG. 9. Differences are that in FIG. 9, four vibrating motors are illustrated. However, to tilt the chair requires only two motors, and two drivers for X and Y directions. These X and Y motors will have servo feedback control. Each servo motor compares input voltage with X servo feedback voltage to follow the X input voltage. Since X and Y motors control the axes independent to each other, X and Y signal addition is not necessary. The electrical signal X representing X axis of the joystick can drive X axis of the tilting chair directly. Likewise, Y axis tilting of the chair will be controlled by the Y processed electrical signal. Although the X and Y tilting chair minimally requires 2 axis drives, an additional axis drive may be added.

The multidimensional physical drive may be accomplished by some other corresponding methods. For example, if three linear drive motors are placed below the chair in a triangle position, it can provide physical movement of X and Y and Z (height) to the user. In this case three motors are placed below the chair seat. Motor A (not shown) is placed front center; Motor B (not shown) is placed back left and Motor C (not shown) is placed back right. If −Y signal from the amplifier 721 is applied to the Motor A, then movement of the joystick will cause the chair to tilt down (forward). If Motor B is driven by −X and Motor C by −X analog signal then the chair will tilt left or right. If CC bias signal (z) is applied to all drives then the chair can rise, lower and roll with X, Y and Z signal. In addition to the tilting chair with X and Y signals, dynamic booster signal 790 such as previously shown in FIG. 10 can be added to the X and Y signal processor to simulate G forces. Also, such a dynamic signal booster circuit with a slow negative feedback will null the signal and stabilize the chair to upright position. The X and Y titling chair can be activated by processed audio signal as previously described the FIG. 11. Also, the vibrating and tilting chair may be controlled by a remote wireless link.

It is worth noting that the computer gameport supports two joysticks each having X and Y. There thus is a total of four analog axes signals at the game port. Some software uses four or more variables, such as X, Y, rotate, thrust, brake, etc. By using two or more analog signals from the input devices, and detected sound to control vibrators and the tilting and lifting chairs, numerous multidimensional dynamic physical environments can be created.

In order to accommodate flexibility of the inputs from the gameport, all incoming signals can be multiplexed (not shown) and selected and processed. The processed signals are channeled to appropriate vibrator or chair motion drivers to fully respond to the multimedia environment.

In summary, the system described in FIG. 9, through FIG. 12 is a novel invention to create a multidimensional environmental vibrator system that will add physical reality to the multimedia computer system. The fact that physical realism is achieved without requiring special interface hardware or modification to the existing or future computer system is greatly appreciated by the user. Since the described invention utilizes only the existing computer input and output ports, it is readily interfaced to any computer software. This invention enables interactive vibrator "plug and play" adaptability.

Figure 13:
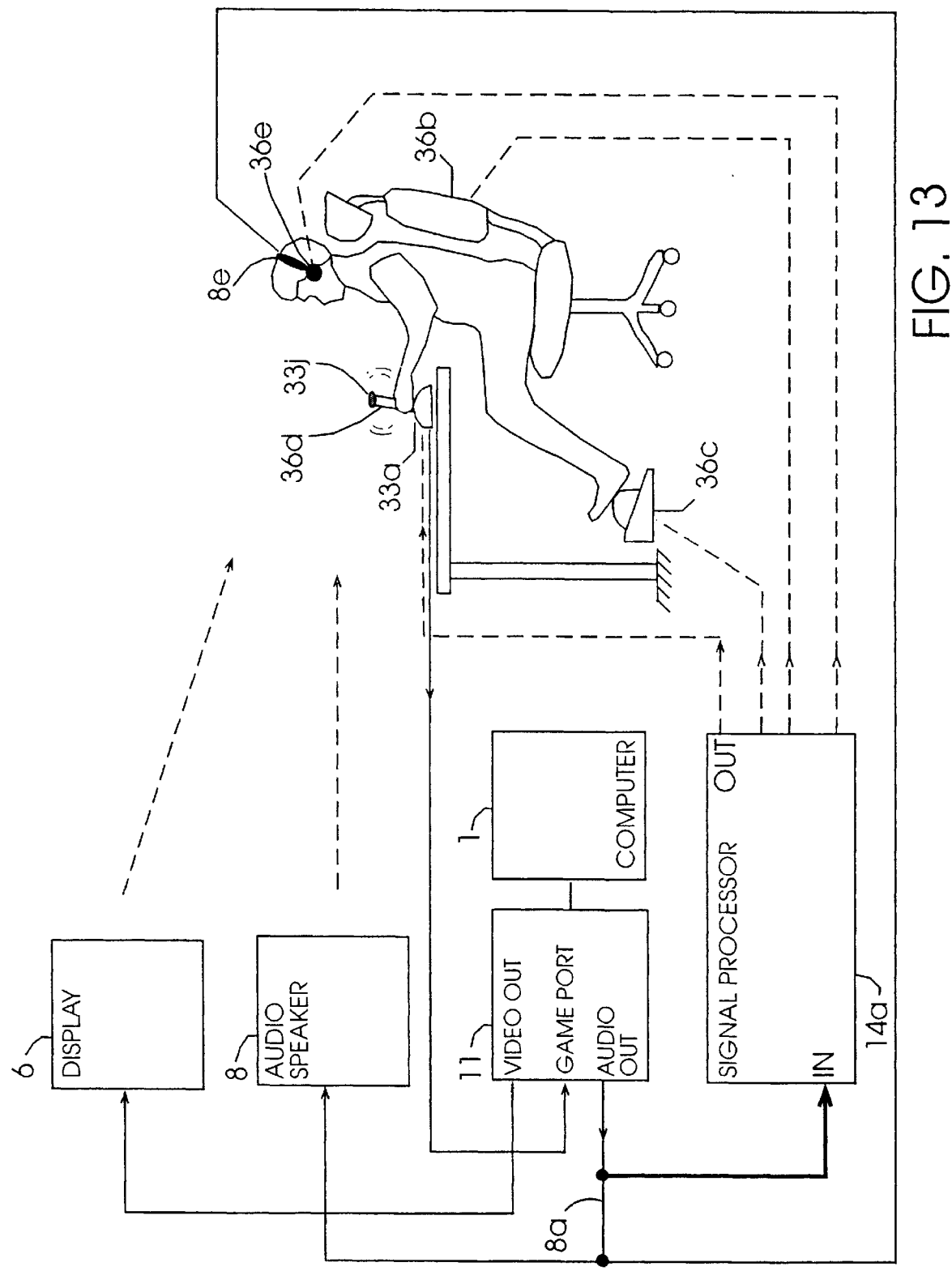
FIG. 13 illustrates an embodiment of present invention to provide interactive vibrator feedback based on audio channel detection and processing.

FIG. 13 illustrates the application based on the present invention to provide interactive vibrator feedback based on audio channel detection and processing. This interactive physical feedback is accomplished without requiring special hardware or software modification in the existing or new computer. Therefore, this invention truly a "plug and play" system.

Referring to FIG. 13, the multidimensional interactive vibrator as activated by an audio signal of the multimedia computer system is show. Interactive games and simulators react to input devices such as a joystick 33, mouse, steering wheels, etc., and create dynamic graphics on a display 6 and sound through audio speaker 8, simulating the environment.

Driving, flight and 3D adventure games create sound effects representing the engine sound, gun firing sound and crashing sound. By detecting audio signals and activating the various vibrators, tactile feedback will be provided to the user.

Audio signal from computer is picked of at the audio channel of computer I/O 11 or at the rear plug of audio speaker 8. The audio signal 8a is processed by signal processor 14a to discriminate various audio signals and produce signal to activate the various vibrators 36a, 36b, 36c, 36d and 36e that are strategically placed to provide physical vibrating feedback.

The signal processor 14a contains bandpass filters, amplifiers, signal amplitude and duration control circuits and output drivers. Examples of signal processing are described in connection with FIG. 6 and FIG. 7 hereinabove.

A vibrating input device shown as joystick 33a contains a vibrating device 36d inside of the joystick handle 33 to provide tactile vibrating feedback to the user's hand. The head vibrating device 36a is placed in the earphone unit 8c (or helmet-like head cover, not shown) to provide vibrating feedback to the user's head area. The chair vibrators are placed in the chair 36b to provide vibration feedback to the user's body. The foot vibrator 36c may also be placed in the foot vibrator unit.

The signal processor/driver will discriminate between the various signal amplitudes, frequency and duration of audio signal created by the computer games, 3D adventure and flight simulation and provide various signals to the various vibrators. The signal processor may be accomplished by analog method; simple amplifier, peak detector and driver amplifier, or digital method; signal detector, pulse sequence generator, amplitude duty cycle controller or well known DSP processor (not shown) to generate various effects.

Accordingly, the reader can see that the interactive vibrator of the present invention provides the user with a non-constant and non-repeating vibrating action to soothe while maintaining the user's alertness and provide a vibrating action which adapts to the user's actions, thus providing an interactive stimulus. In addition, these benefits are available without requiring special software installed on the user's computer, or equipment specialized to each type of computer. In other embodiments, realism is added to computer games independent of the hardware/software platform.

While plural embodiments of the present invention have been shown and described, it will be apparent to those skilled in the art that many changes and modifications may be made without departing from the invention in its broader aspects. For example, it is clear to those familiar with the art that many means of programming the response of the vibrator system, through hardware or software, are encompassed by the spirit of this invention. It is also clear that programming the attack, decay, strength, amplitude and frequency modulation of the vibrations as a response to various user's actions are included within the scope of this invention. Furthermore, future input devices yet to be defined, may be sensed in a corresponding manner as a mouse or a joystick within the range of this invention. The appended claims are therefore intended to cover all such changes and modifications as fall within the true spirit and scope of the invention.

What is claimed is:

1. A vibrator for applying soothing and stimulating vibrations to a human body, comprising:

a vibrating device, a detector means to detect electronic signals sent between a computer and an input/output device, and an electronic circuit which dynamically drives said vibrating device in response to characteristics of said electronic signals, wherein said electronic circuit further comprises:

a peak detector which responds substantially fully to individual instances of said signals, and an integrator which responds partially to individual instances and substantially fully to multiple instances of said signals and maintains vibration for multiple seconds after cessation of said signals.

2. A vibrator for applying soothing and stimulating vibrations to the human body, comprising:

a plurality of vibrating devices, a multi-media computer which generates audio signals, a detector means to detect electronic representations of said audio signals, and an electronic circuit comprising a plurality of bandpass filters to separate portions of the audio band and a plurality of drivers to drive each of said vibrating devices in response to characteristics of said electronic signals.

3. A vibrator for applying soothing and stimulating vibrations to the human body according to claim 2 wherein said plurality of drivers drive ones of said vibrating devices differently in response to characteristics of said electronic signals.

4. A vibrator for applying stimulating vibrations to the human body, comprising:

a plurality of vibrating devices, a detector means to detect electronic representations of audio signals, an integrator which responds partially to individual notes and substantially fully to multiple notes of said audio signals and maintains vibration for multiple seconds after cessation of said signals, and a plurality of electronic circuits, ones of said plurality of circuits comprising:

a bandpass filter to separate portions of the audio band, a peak detector which responds substantially fully to individual notes of said audio signals, and a driver to drive one of said vibrating devices.

5. An interactive vibrator system to provide physical vibration that represents movement of an input device of a computer, comprising:

multiple vibrators, signal pulse-width detectors, pulse-width to amplitude conversion means, a signal processor means to process X and Y signals, a driver means to drive said multiple vibrators, and multiple modulation frequency mixers to create lower beat frequency to simulate low frequency vibration of mechanical vehicle vibrating motion.

6. An interactive multidimensional vibrating system to provide physical vibration that represents movement of an input device of a computer, comprising:
- multiple vibrators,
- signal pulse-width detectors,
- pulse-width to amplitude conversion means,
- a signal processor means to process X and Y signals,
- a driver means to drive said multiple vibrators,
- audio signal pick off means,
- signal processor means for processing picked off audio signal, and
- signal mixer means to combine processed audio signal to X and Y movement signal.

7. An interactive multimedia tilting chair which is activated by signal created by X and Y input devices, comprising:
- X and Y movement signal pick off,
- a processor means to convert detected X and Y movement signal to corresponding X and Y tilting chair movement,
- an electromechanical X and Y motion driver to tilt said chair,
- multiple vibrating devices placed under the feet and chair of a user,
- an audio signal pick off means,
- a signal processor means to process amplitude and frequency of audio signal, and
- a signal processor means to modulate processed audio signal to the signal driving mechanical vibrator, and chair tilting electromechanical driver.

* * * * *